W. T. CRANDELL & H. F. WARD.
Oyster-Dredging Machinery.
No. 197,341. Patented Nov. 20, 1877.
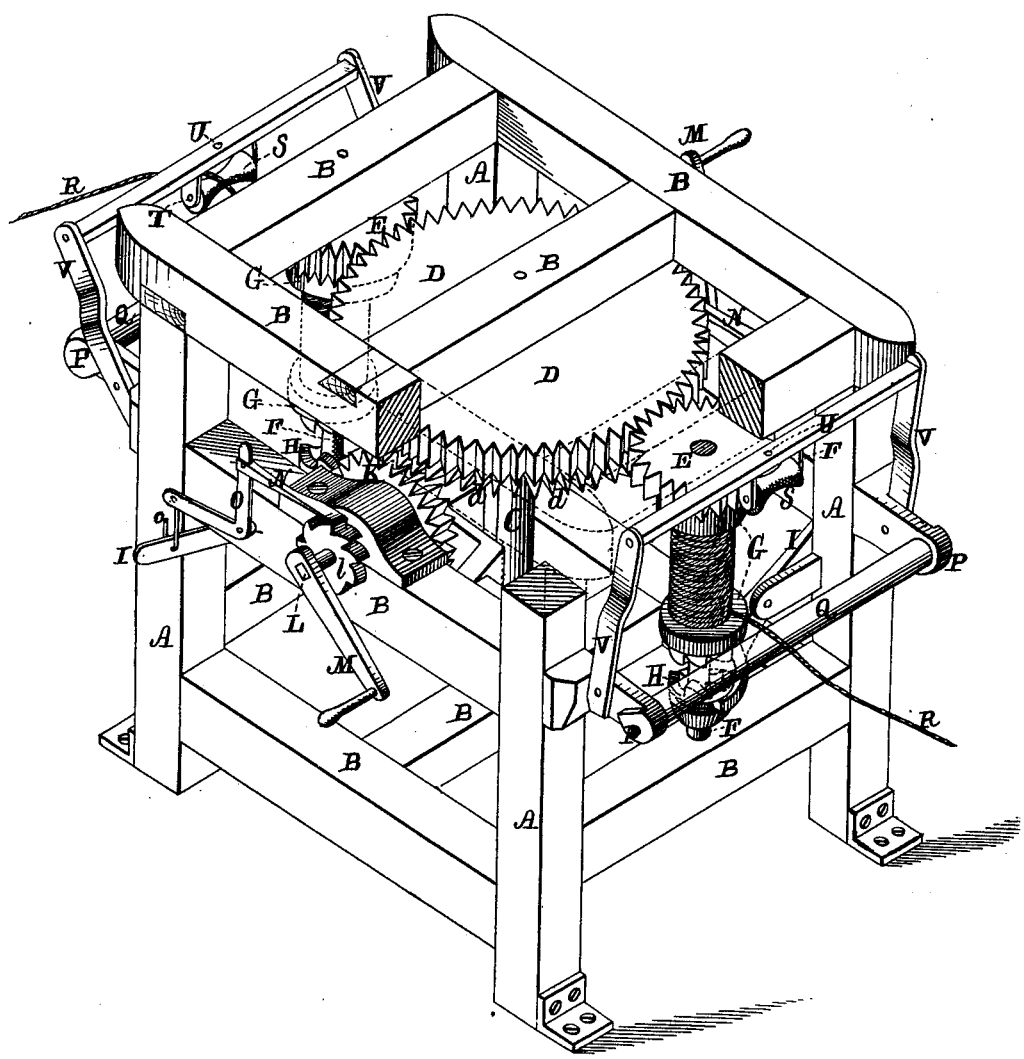
WITNESSES:
Jas. O. Hutchinson.
Henry O. Hazard.
INVENTORS:
W. T. Crandell and H. F. Ward,
by Prindle and Loomis Attys

UNITED STATES PATENT OFFICE.

WILLIAM T. CRANDELL AND HEZEKIAH F. WARD, OF TRACY'S LANDING, MARYLAND.

IMPROVEMENT IN OYSTER-DREDGING MACHINERY.

Specification forming part of Letters Patent No. 197,341, dated November 20, 1877; application filed July 31, 1877.

*To all whom it may concern:*

Be it known that we, WM. T. CRANDELL and HEZEKIAH F. WARD, of Tracy's Landing, in the county of Anne Arundel, and in the State of Maryland, have invented certain new and useful Improvements in Machinery for Dredging Oysters; and do hereby declare that the following is a full, clear, and exact description thereof, reference being had to the accompanying drawing, making a part of this specification, in which is shown, in perspective, our device arranged for use.

Our invention is an improvement upon a similar device for which Letters Patent No. 178,493 were granted to us upon the 6th day of June, 1876; and it consists, principally, in the means employed for simultaneously releasing the winding-spools and locking the operating-gearing, substantially as and for the purpose hereinafter specified.

It consists, further, in the means employed for sustaining and guiding the lines, substantially as and for the purpose hereinafter set forth.

It consists, finally, in the construction and combination of the several parts of the device, substantially as and for the purpose hereinafter shown and described.

In the annexed drawing, A and A represent vertical posts, which are arranged in the form of a parallelogram, and are connected together by means of a number of horizontal rails, B, the whole forming the supporting-frame for the mechanism of our device.

Journaled vertically within suitable bearings at the center of the frame is a shaft, C, which, at its upper end, is provided with a gear-wheel, D, that meshes with and imparts motion to two pinions, E, that are each secured to or upon a separate shaft, F, which shafts are journaled vertically upon opposite sides of the shaft C. Upon each shaft F, immediately below the pinion E, is journaled a spool, G, which is capable of an independent rotary movement, while below each spool is placed a clutch, H, that is arranged to rotate with its shaft, and is capable of being moved vertically thereon, so as to cause its upper toothed end to engage with the correspondingly-toothed lower end of said spool, and lock the latter upon, and cause it to rotate with, said shaft.

Each clutch H is operated by means of a lever, I, which is pivoted to or upon one of the posts A.

The invention thus described is the same as that covered by our patent hereinbefore named.

Upon the lower face, near the periphery of the gear-wheel D, are crown-wheel teeth d, which, at each side of the frame, mesh with a pinion, K, that is secured upon and revolves with a shaft, L, which is journaled within suitable bearings attached to said frame, and at its outer end is provided with a crank, M, that enables said shaft to be rotated, and, through the gearing named, motion to be imparted to the shafts F.

Upon each shaft L is provided a ratchet-wheel, l, with which engages a pawl, N, that is pivoted at its rear end to or upon the end of one arm of a bell-crank, O, the opposite end of which crank is connected with the lever I by means of a link, o.

As thus arranged, it will be seen that by depressing the outer end of the lever I, so as to throw the clutch H into engagement with the spool G, the pawl N will be raised and prevented from engagement with the ratchet-wheel l, while by raising said lever, so as to disengage said clutch, said pawl will be dropped into engagement with said ratchet-wheel, and the backward motion of the shaft L will be prevented.

Journaled within suitable brackets P, which extend horizontally outward from each end of the frame, at or slightly above the vertical center of the spoke G, is a roller, Q, that furnishes a bearing for the line R of a dredge when the gunwale of the vessel has the usual height.

For use with vessels having gunwales that are unusually high, a roller, S, is journaled within a frame, T, which is swiveled upon a bar, U, and said bar is secured at its ends to or upon the outer ends of two other bars, V, that have their inner ends pivoted upon the brackets P, in such a manner as to permit of their passing from a vertical position to an angle of forty-five degrees therewith, the arrangement being such as to enable said roller S to change the line of its axis horizontally, while when not in use said roller may be raised to the position shown in the drawings.

If, now, the roller-frame be lowered, and the line R passed from the dredge over the roller S, and then under the roller Q, said line will be enabled to clear a high gunwale, or other similar obstacle, without interference with its winding upon the spool G.

By use of the crown-wheel and pinions, in place of the worms and worm-wheel before employed, much greater speed is secured, while, by means of the connection between the clutch-lever and pawl of each side of the machine, either line may be released and permitted to run out without interference with the line of the other dredge, the instant engagement of said pawl, when said clutch is released from engagement with its spool, preventing all backward motion of the gearing.

Having thus fully set forth the nature and merits of our invention, what we claim as new is—

1. In combination with the spool G and the operating-shaft L, provided with the ratchet-wheel $l$, the clutch H, lever I, pawl N, bell-crank O, and link $o$, substantially as and for the purpose specified.

2. In an oyster-dredging machine, the combination, with the spool G, of the roller Q, journaled within a fixed frame, and the roller S, journaled within the swiveled frame T, and supported by a vertically-adjustable frame, substantially as and for the purpose set forth.

3. As an improvement in mechanism for dredging oysters, the shafts C, F, and L, the combined spur and crown-gear wheel D, the pinions E and K, the spools G, the clutches H, the clutch-levers I, the cranks M, the ratchet-wheel $l$, the pawl M, the bell-crank O, the link $o$, the roller Q, journaled within a stationary frame, and the roller S, arranged to swivel and to be adjusted vertically, said parts being combined with each other and with the supporting-frame, in the manner and for the purpose substantially as shown and described.

In testimony that we claim the foregoing we have hereunto set our hands this 6th day of July, 1877.

WM. T. CRANDELL.
HEZEKIAH F. WARD.

Witnesses:
JOSEPH S. WARD,
F. LEITCH.